United States Patent [19]

Dusza et al.

[11] 4,038,014
[45] July 26, 1977

[54] LENS MOLD

[75] Inventors: Robert J. Dusza; Joseph W. Kantorski, both of Southbridge, Mass.

[73] Assignee: American Optical Corporation, Southbridge, Mass.

[21] Appl. No.: 726,708

[22] Filed: Sept. 24, 1976

[51] Int. Cl.² .................. B29C 17/04; B29D 11/00; B29C 1/02
[52] U.S. Cl. .................. 425/388; 425/405 R; 425/808; 425/389; 249/112
[58] Field of Search ........... 425/808, 388, 405 R, 425/403, 387, 389; 249/117, 112

[56] References Cited
U.S. PATENT DOCUMENTS

| | | | |
|---|---|---|---|
| 2,441,097 | 5/1948 | Hicks | 425/388 |
| 3,004,295 | 10/1961 | Bottoms et al. | 425/388 X |
| 3,061,881 | 11/1962 | Sherno | 425/388 X |
| 3,072,961 | 1/1963 | Gilbert | 425/388 |
| 3,290,418 | 12/1966 | Best | 425/388 X |
| 3,315,313 | 4/1967 | Steigman | 425/388 X |
| 3,353,219 | 11/1967 | Snyder | 425/405 R |
| 3,422,495 | 1/1969 | Jones | 425/808 X |
| 3,897,530 | 7/1975 | Leathers | 425/388 X |

Primary Examiner—J. Howard Flint, Jr.
Attorney, Agent, or Firm—H. R. Berkenstock, Jr.; William C. Nealon

[57] ABSTRACT

A mold for forming lens blanks to meniscus shapes under applied heat and a force created by partial vacuum. A cupped lens shaping surface in the mold is cushioned and covered with a synthetic fabric for effecting exceptional accuracy in lens blank conformance to shaping surface curvature, optimum surface smoothness and quick release upon completion of a forming cycle.

10 Claims, 8 Drawing Figures

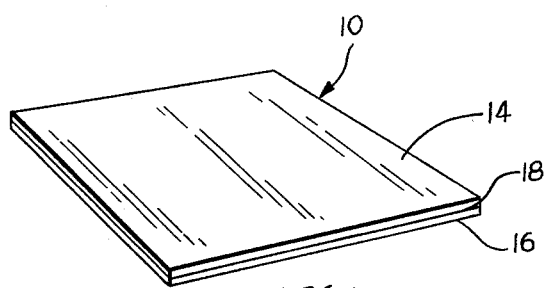
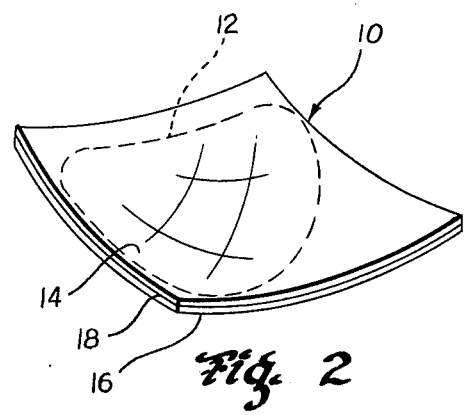
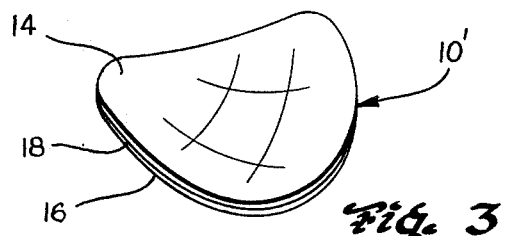
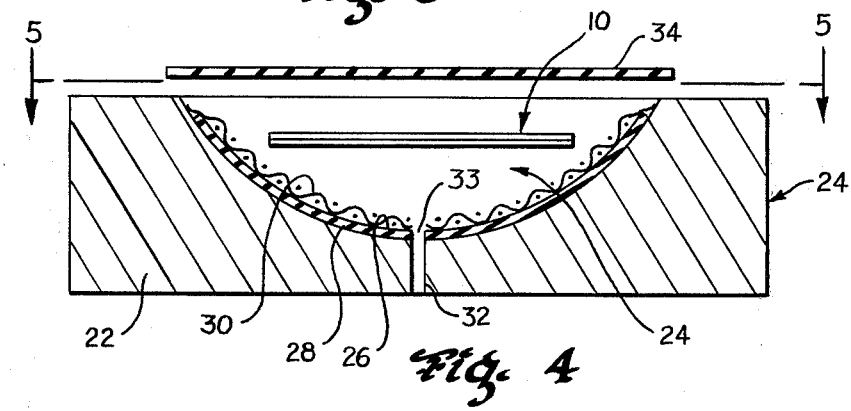
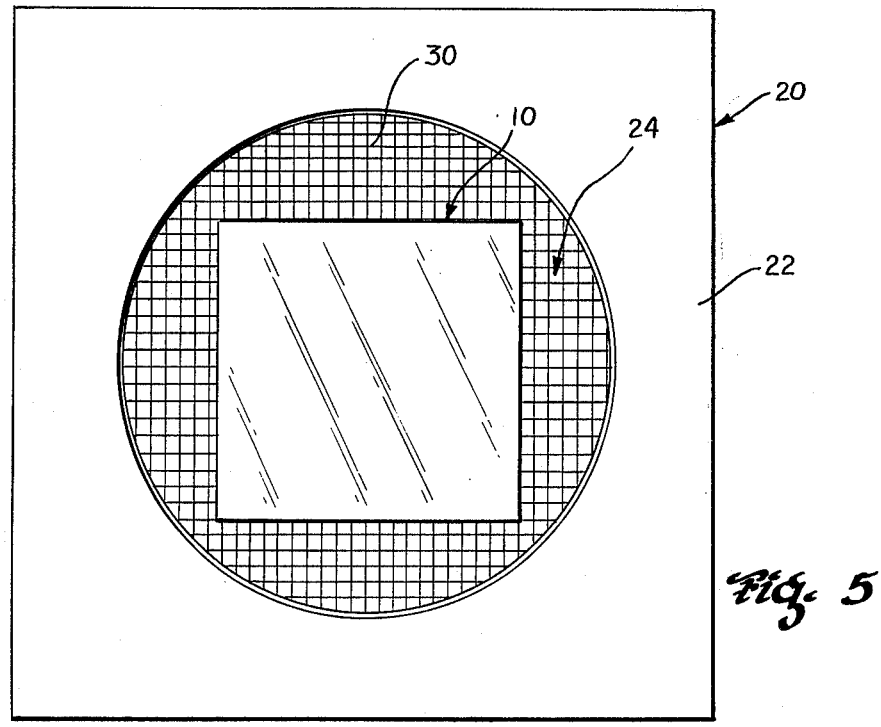

LENS MOLD

BACKGROUND OF THE INVENTION

1. Field of the Invention

Lens manufacturing apparatus with particular reference to plastic lens shaping molds.

2. Discussion of the Prior Art:

Lens blanks of thin plastic flat stock may be heated and formed to meniscus shapes by slumping, pressing or urging with partial vacuum against a cupped shaping surface. In order to avoid lens surface marring by occurrences of machine marks, scratches or air-borne contaminents on the shaping surfaces they are customarily cushioned with a thin, smoothly surface layer of rubber. However, while serving to relieve at least some of the problems of lens surface marring, this mold surface treatment is not conducive to free sliding of a lens blank over the shaping surface during its being brought from flat to a curved shape and occurrences of lens than optimum conformance to the shaping surface curvature (i.e. some flattening of centermost positions of blanks from expected curvature) have been problematic. Additionally, the tendency for sticking and need for deliberate picking of the finished lens blank tends to render mass production performance of the lens shaping operation tedious as well as abusive to the mold surface cushion. The need heretofor for frequent time consuming and costly repair and/or replacement of the mold surface cushion together with less than optimum accuracy of final lens surface curvature has left a long standing need for improvement in the art.

Attempts to overcome lens blank drag and sticking problems have included experimentation with and the use of release agent coatings including various powders and sprays most of which were found to be either damaging to the lens and/or mold surfaces or difficult to remove from the lens products as well as of short-term usefulness requiring re-application with each lens forming operation. At best, this approach to lens sticking problems involves a need for uneconomical extra operations of repeatedly treating the mold surfaces and/or cleaning of the lens products as well as the added cost and problem of inventorying separate mold release products.

Accordingly, an object of the present invention is to accomplish in plastic lens blank shaping operations a quick, residue-free lens release at shaping cycle end and optimum optical quality of lens blank surfaced texture, accuracy of intended lens geometry and long production run capabilities.

A further objective is to accomplish the foregoing in simple and economical fashion and, in particular, without the need for auxiliary release agents and/or end product residue removal operations.

Other objects and advantages of the invention will become apparent from the following description.

SUMMARY OF THE INVENTION

The aforesaid objects and their corollaries are accomplished according to the invention by applying to a lens blank mold surface, a thin uniform thickness of cushioning rubber and a covering thereover of a polyester monofilament fabric. The polyester fabric is bonded to the mold surface cushion with a room temperature vulcanizing (RTV) silicone sealant for permanence of assembly and long term use in affording the desired quick, residue-free release of lens blanks at forming cycle end and minimal resistance to sliding of the blank thereover as may be required for cupping into precise conformance with the shaping surface curvature. Interstices in the polyester covering minimize direct contact between lens blank and mold shaping surface for enhancing quick release without adverse affect upon product surface texture. The interstices further afford out-of-the-way space for unavoidable occurrences of particulate or other foreign matter between the lens blank and its casting surface. By such means, mold surface contaminents are substantially completely prevented from impressing and/or becoming attached to or otherwise marring surfaces of the lens blank products.

It is contemplated that edges of the synthetic fabric covering may be encapsulated in the aforementioned sealant and/or rubber cushion for protection against fraying under prolonged use thereby further extending the useful life of the system.

Details of the invention will become apparent from the following description when taken in conjunction with the accompanying drawings in which:

FIG. 1 is an illustration in perspective of a lens blank which is typical of a type to which equipment of the present invention is particularly applicable;

FIG. 2 is an illustration, also in perspective, of an end product of the invention produced from a workpiece similar to that depicted in FIG. 1;

FIG. 3 is an illustration, in perspective, of a finished ophthalmic lens which may be formed from the product illustrated in FIG. 2;

FIG. 4 is an illustration, in cross-section, of lens mold apparatus incorporating a preferred embodiment in the invention;

FIG. 5 is a plan view of the apparatus illustrated in FIG. 4 taken generally along line 5—5 looking in the direction of the arrows;

Description of the Preferred Embodiments

Figure 6:
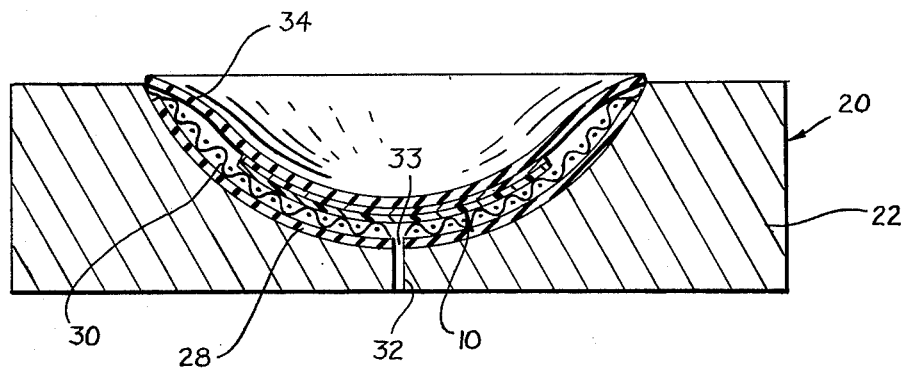
FIG. 6 is an illustration, in cross-section, of the mold apparatus of FIGS. 4 and 5 wherein the lens blank shaping operation contemplated by the invention is illustrated.

In the manufacture of plastic ophthalmic lenses for use in sunglasses and goggles, for example, it is customary to produce the lens stock material in flat sheet form from which blanks 10 (FIG. 1) may be punched or cut and thereafter pressed, slumped or otherwise urged under the influence of heat into a cupped or meniscus configuration such as that illustrated in FIG. 2. A finished ophthalmic lens 10 ' (FIG. 3) may be removed from the meniscus blank by punching or cutting same along broken line 12.

A typical flat lens blank 10 (FIG. 1) may comprise a laminate of outer layers 14 and 16 of clear or colored cellulose acetate butyrate and an interfacial layer 18 of polyvinyl alcohol which may have been pre-stretched or otherwise treated for undirectional orientation of it's molecules and dyed, eg, with an iodine-iodide dye to render the ultimate structure of lens blank 10 light-polarizing .

The overall thickness of the laminate of layers 14, 16 and 18 may, for example, be in the order of from 0.5 to 1 mm. in thickness. It should be understood, however, that the above mentioned materials, construction and dimensions of lens blank 10 are given for illustrations only and that the present invention is applicable to the molding of lens blanks to the configuration illustrated in FIG. 2 whether the blanks are of the aforesaid exemplary shapes, sizes, thickness and construction or formed of various other heat-softable and yieldable materials. For example, lens blank 10 may be formed of a single thickness of plastic material, two plyes or more than the above mentioned three plyes.

Referring more particularly to the crux of the invention, there is shown in FIGS. 4 and 5 an exemplary lens mold 20, the base 22 of which is provided with a lens shaping cavity 24. Base 22, preferably being formed of a rigid metallic material such as cast and/or machined aluminum, is provided with a lens shaping surface 26 (FIG.4) which is given the radius of curvature to which lens blank 10 (FIG. 1) is desired to be cupped (i.e.rendered meniscus) as shown in FIG. 2.

Lens shaping surface 26 is covered with a cushion 28 (FIG. 4) of uniform thickness throughout. Cushion 28 may be formed of any of various well known mold making rubber materials of which a room temperature vulcanizing silicone rubber is exemplary. A commercially available and desireable silicone rubber product is marketed under the tradename Silastic E RTV by Dow-Corning.

Cushion 28 is vulcanized or otherwise fixedly secured to surface 26 of base 22 and covered with synthetic fabric 30 (FIGS. 4 and 5). A preferred fabric 30 is that formed of a polyester monofiliment having a mesh size of approximately 330. A somewhat greater or lesser number of intersticies per linear inch may, of course, be used (e.g. form 250 to 450) provided the maximum size of mesh openings is held below that having a tendency to impress or otherwise mar the lens blank surface to be formed thereagainst. A mesh of 450 is considered maximum for purposes of the present invention wherein optimum end product lens surface smoothness or lack of marring is strived for.

The polyester monofiliment fabric is applied to cushion 28 of lens mold 20 preferably by first cupping the fabric to a shape corresponding in curvature to that of the uppermost surface of cushion 28. This forming operation may be accomplished by stretching the fabric over a pre-shaped, preferably heated, mandrel so as to relatively permanently set the shape of the thus formed fabric when it is cooled to room temperature. A suitable mandrel temperature is approximately 200° C. A small opening 33 is punched or therewise formed so as to extend through the fabric adjacent the center or apex of the cupped section and the section is edged to a diamentral size approximately corresponding to that of cushion 28.

The upper surface of cushion 28 is next cleaned, e.g. with acetone, and provided with a thin layer of silicone rubber adhesive of the commercially available room temperature vulcanizing type of which a product known to the trade is RTV:112 manufactured and sold by General Electric Company is exemplary. Prior to application of the adhesive, however, it is preferably mixed with one part mineral spirts to two parts by weight of RTV-112 adhesive. It is then spread over cushion 28 to a thickness of from 0.025 mm. – 0.075mm. for best results.

The cupped fabric is placed on the adhesive coated surface of cushion 28 and centered by means of the above mentioned opening 33 being placed in alignment with passage 32 in base 22 of mold 20. During this positioning of fabric 30 a vacuum of approximately 20mm. Hg is applied and maintained in passage 32 by means of any suitable source of vacuum equipment (not shown). a top rubber 34, i.e. a circular piece of flat natural or synthetic rubber, is placed over fabric 30 to close cavity 24 causing the resulting partial vacuum created therein to draw the top rubber 34 against fabric 32 and force an intimate bond between fabric 30 and cushion 28. The vacuum is maintained until completion of room temperature curing, i.e. vulcanization, of the silicone rubber adhesive. Thereafter the top rubber 34 is removed and both the central hole 33 through the fabric 30 and passage 32 are cleared of any obstruction which may be caused by inclusions of the silicone rubber adhesive, particles of cushion 28 or fabric 30. This may be accomplished with an ordinary drill. A No. 68 drill will provide a suitable final hole size through the fabric, the cushion and the mold base 22. With mold 20 so constructed, the shaping of a lens blank, e.g. blank 10, may be accomplished by placing the blank in cavity 24 and positioning a rubber 34 thereover as diagmaticly illustrated in FIG. 4.

A lens blank 10 having an overall thickness of approximately from 0.75 to 1 mm. and comprised of layers 14 and 16 of celulose acetate butyrate with an interfacial minimul thickness of polyvinyl alcohol may be formed to the curved configuration of the cushioned and fabric covered lens shaping surface 26 by heating mold body 22 to a temperature of from 85° to 95° C and urging blank 10 against fabric 30 by evacuating chamber 24 through opening 33 and passage 32. With rubber 34 over the lens blank chamber 24 is sealed causing blank 10 to be drawn against fabric 30 with rubber 34 following lens blank 10 an illustrated in FIG. 6. With lens blank 10 so shaped and held thereinplace for approximately 3 minutes, evacuation through passage 32 is discontinued, rubber 34 removed and the thus meniscusly shaped blank 10 lifted from cavity 24. The removal of blank 10 may be facilitated by selectively forcing air under pressure through passage 32 and/or an additional passage (not shown) may be provided in cavity 24 for this purpose if desired. The arrangements of passages such as 32, vacuum producing equipment and supply lines and/or air pressure lines and the like do not form a particular part of the present invention and therfore will not be described in detail herein since it is well within the skill of the artisan to arrange for an operate such means.

In actual reductions to practice of the present invention under conditions described hereinabove, curved surfaces produced upon the lens blanks maintained uniformity across the blanks, the optical surface textural quality smoothness was found to be well within acceptable limits, the finished blanks were quickly released and easily removed from the shaping mold, they were free of foreign matter and /or imprint from the polyester monofilment fabric and production was greatly increased over that obtainable by prior methods.

Figure 7:
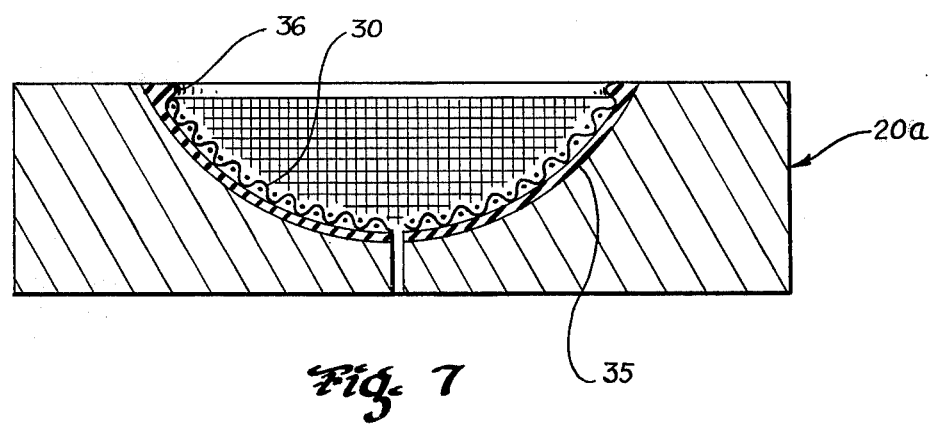
FIG. 7 is a view, in cross-section, of a modification of the mold apparatus.
Figure 8:
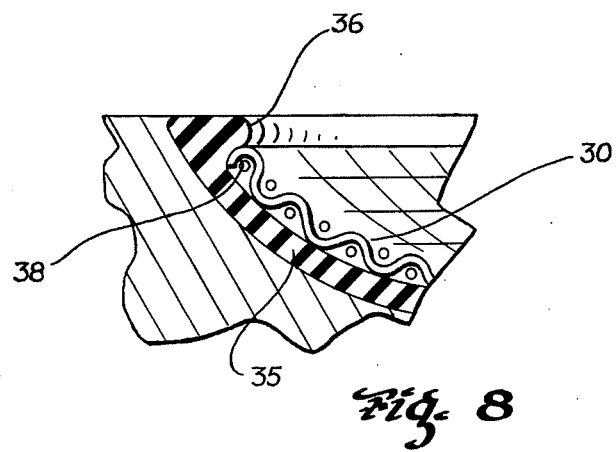
FIG. 8 is a greatly enlarged fragmentary section of the apparatus illustrated in FIG. 7 wherewith structural details of the modification may be more clearly understood.

Referring more particularly to FIGS. 7 and 8 a modification of the invention is illustrated wherein the polyester monofilment fabric 30 is recessed into cushion 35 in mold 20a. Cushion 35 is provided with inwardly directed lip 36 which is best illustrated in FIG. 8. By such means, edges 38 of fabric 30 may be imbedded or recessed within the material of cushion 35 so as to prevent wear and fraying during the use of mold 20a and wherewith the useful life of the cushion 35 and fabric 30 system may be appreciably extended.

It is contemplated that fabric 30 be applied to cushion 35 either subsequent to the formation of lip 36 or in a single operation of casting or molding the cushion to it's final shape against and/or over fabric 30.

Those skilled in the art will readily appreciate that there are various midifications and adaptations of the precise forms of the invention here shown which may suit particular requirements and that the foregoing illustrations are not to be interpreted as restrictive of the invention beyond the necessitated by the following claims.

We claim:

1. A lens shaping mold of rigid base material having a lens blank receiving cavity of concave surface curvature substantially corresponding to a shape desired to be imparted to at least one surface of a lens placed in said cavity and urged against said cavity surface wherein the improvement comprises;
    a cushion of uniform thickness extended over at least the major portion of said concave surface of said cavity, said cushion being adhered to said cavity surface; and
    a covering of synthetic open texture fabric extended over and adhered to said cushion.

2. A mold according to claim 1 wherein said fabric is formed of a polyester monofilment.

3. A mold according to claim 1 wherein said fabric open texture is approximately 330 mesh.

4. A mold according to claim 2 wherein said fabric open texture is approximately 330 mesh.

5. A mold according to claim 1 wherein said cushion is formed of silicone rubber and is vulcanized to said cavity surface.

6. A mold according to claim 5 wherein said open textured fabric is adhered to said cushion with a room temperature vulcanizing silicone rubber adhesive.

7. A mold according to claim 1 wherein a portion of said cushion is extended over edges of said fabric covering.

8. A mold according to claim 7 wherein said edges of said fabric is imbedded in the material of said cushion.

9. A mold according to claim 1 further including a passageway communicating with said cavity for evacuating air and gases therefrom during a lens blank shaping operation.

10. A mold according to claim 9 still further including a removable top rubber member adapted to cover said lens blank receiving cavity when placed thereover for facilitating evacuation of air and gases therefrom.

* * * * *